US012269188B2

(12) United States Patent
Pelc

(10) Patent No.: US 12,269,188 B2
(45) Date of Patent: Apr. 8, 2025

(54) PORTABLE MULTIDIRECTIONAL SURFACE DEVICE

(71) Applicant: THE IPE CLIP FASTENER COMPANY, LLC, Bradenton, FL (US)

(72) Inventor: Robert J. Pelc, Sarasota, FL (US)

(73) Assignee: THE IPE CLIP FASTENER COMPANY, LLC, Bradenton, FL (US)

(*) Notice: Subject to any disclaimer, the term of this patent is extended or adjusted under 35 U.S.C. 154(b) by 301 days.

(21) Appl. No.: 17/537,690

(22) Filed: Nov. 30, 2021

(65) Prior Publication Data

US 2023/0095435 A1 Mar. 30, 2023

Related U.S. Application Data

(60) Provisional application No. 63/085,207, filed on Sep. 30, 2020.

(51) Int. Cl.
*B27C 5/10* (2006.01)
*B27C 1/02* (2006.01)
*B27C 1/14* (2006.01)

(52) U.S. Cl.
CPC .................. *B27C 5/10* (2013.01); *B27C 1/02* (2013.01); *B27C 1/14* (2013.01)

(58) Field of Classification Search
CPC B27C 5/10; B27C 1/005; B27C 1/007; B27C 1/02; B27C 1/04; B27C 1/10; B27C 1/12; B27C 1/14; B27C 9/00; B27C 9/005; B27C 9/02; B27M 3/04; B27M 3/18; B27M 3/34; B27B 5/10; B27B 17/0091
See application file for complete search history.

(56) References Cited

U.S. PATENT DOCUMENTS

| | | | | |
|---|---|---|---|---|
| 4,275,501 A * | 6/1981 | Haire | B23Q 9/0071 30/388 |
| 4,290,719 A * | 9/1981 | Worthington | B23C 1/20 D15/138 |
| 6,745,803 B2 * | 6/2004 | Sanfilippo | B23D 47/025 144/286.5 |
| 7,770,574 B1 * | 8/2010 | Ferreira | B28D 1/045 299/39.3 |
| 9,376,776 B2 * | 6/2016 | Kempken | E01C 23/0933 |
| 11,685,075 B2 * | 6/2023 | Wollenburg | B23Q 11/0046 144/363 |
| 2003/0070306 A1 * | 4/2003 | McDonald | B27B 9/02 30/371 |

* cited by examiner

*Primary Examiner* — Matthew Katcoff
(74) *Attorney, Agent, or Firm* — LAW OFFICES OF ALOZIE N. ETUFUGH, PLLC; Alozie N. Etufugh, ESQ.

(57) ABSTRACT

A portable multidirectional surface device, which may include one or more slide bearing glides and one or more base lengths which may are positioned adjacent the one or more slide bearing glides. One or more connecting plates, positioned above the base length(s), is connect with the base length(s) and the slide bearing glide(s). Providing motion to the device are multidirectional contact point(s) which are connected to the one or more connecting plates. The slide bearing glide(s) in conjunction with the base length(s) enable the use and operation of tools with the device.

16 Claims, 13 Drawing Sheets

PORTABLE MULTIDIRECTIONAL SURFACE DEVICE

CROSS-REFERENCE TO RELATED APPLICATIONS

This application claims the benefit of, and is related to, Applicant's following provisional patent application: U.S. Provisional Patent Application No. 63/085,207 titled "Portable Multidirectional Surface Device" filed Sep. 30, 2020, which is incorporated herein in its entirety.

FIELD OF THE INVENTION

The present invention is directed to woodworking devices, and, more particularly, to a device that would allow a tool, router or any other type of wood working device to be easily moved over a workpiece for certain purposes such as, without limitation: creating a level surface, creating a smooth surface, cutting pegs or floor elements to establish a uniformly level surface etc.

BACKGROUND OF THE INVENTION

The electric router is an extremely versatile woodworking tool. Depending on the bit or cutter it may be used shaping, trimming, joint making, and even to create a smooth surface.

There are numerous devices/fixtures that hold a router stationary. The design of these devices/fixtures depends on where the operator wants to hold the tool in relation to the workpiece, whether it be below, to the side, or above the work. Perhaps the most common stationary fixture is a router table which holds the router below the work. A joinery fixture typically holds the router beside the work to make joinery cuts. An overarm overhead router holds the router above the work. Overhead routers are frequently utilized in computer numerical control (CNC) applications.

In recent years, routers have become more and more frequently used in an overhead position for the purpose of smooth surfacing a side of rough-cut timber or other wood that is too large to fit in portable planers. In order to facilitate that application, numerous sleds have been devised to allow the router to be passed easily over the surface of the wood in overlapping passes. Typically, such sleds have some form of a base plate that the router attaches to, and then that assembly is attached to an apparatus that allows the router to slide, along a rail system, widthwise and perpendicularly, lengthwise. Successive passes allow the router head to be lowered incrementally until the entire piece has been planed level. These devices are readily available commercially and as "do it yourself" kits or plans.

As the width of the piece increases, however, it becomes difficult to create an apparatus that is truly stable or portable. The materials used in the apparatus must be extremely rigid and the underlying table for the sled to attach to is not easily portable as the width increases. As the width of the apparatus increases, sagging and flexing of the rail system decreases accuracy or consistency of the desired flat surface cut. These systems therefore have a maximum width and length, thus limiting the size of the workpiece.

These problems are often accentuated in the production of epoxy/wood river tables which are becoming very popular. A river table is a form of table created by taking two narrower wood slabs side by side (often a wide live edge slab cut in half) and filling the gap between the two narrow slabs with a bonding epoxy which creates the "river" effect. Frequently, the narrower slab pieces can pass through standard planers but the combined pieces including the epoxy middle are too wide for portable or even standard planers.

SUMMARY OF THE INVENTION

Aspects of embodiments of the present invention is designed for those circumstances where the narrow side slabs can be passed through a standard or portable planer prior to bonding the pieces into a table. In those cases, the side slabs are level but after pouring the epoxy the "river" portion of the slab extends above the level side slabs. Aspects of embodiments of the present invention contemplate a simple, rigid base of varying lengths with three or more contact points that allow for movement in any direction. For certain aspects of embodiments of the present invention, a "contact point" could be a caster wheel, rotating wheel, a movable sphere, ball or any other device that enables motion in a number of directions. A router is attached or placed on the base with the cutting head facing downward. The wheels or contact points of the base would then run on top of the already smooth slabs on wider projects, or on the underlying workbench for narrower projects. The length of the base can be adjusted so that the wheels or contact points on either end can ride on the already planed and level side slabs. This allows the cutting head on the router to be passed over an epoxy "river" section, for instance, incrementally planning the epoxy surface to the same level as that of the side slabs. The present invention greatly eases the production of wide river tables and is readily portable. Descriptions of aspects of embodiments of the contemplated invention thus follows.

An aspect of an embodiment of the present invention contemplates a portable multidirectional surface device, which may include: at least one slide bearing glide, at least one base length positioned adjacent the slide bearing glide, at least one connecting plate, which may be positioned above the at least one base length. The at least one connecting plate may be connected with the at least one base length and the at least one slide bearing glide. The contemplated portable multidirectional surface device may include at least one contact point connected to the at least one connecting plate, where the contact point(s) may be multidirectional.

In an aspect of an embodiment of the present invention, the at least one contact point of said portable multidirectional surface device may be a rotating wheel, rotating ball, caster wheels, ball casters or any other device capable of motion in different directions.

In an aspect of an embodiment of the present invention, the at least one slide bearing glide may be or may include an L-shaped length having two sides. In an aspect of an embodiment of the present invention, the at least one base length may include a length having a square cross-section, and where at least one side of the at least one base length may have a smaller width than at least one side of the at least one slide bearing glide.

In an aspect of an embodiment of the present invention, at least one side of the at least one slide bearing glide may be or may comprise of a lip where the lip is the portion of the at least one slide bearing glide that is wider than the side of the at least one base length. In an aspect of an embodiment of the present invention, the lip may be structurally enabled to allow for positioning and operation of a tool, router or any other wood working device along length of the lip.

In an aspect of an embodiment of the present invention, the portable multidirectional surface device may include at least one standoff connected to the at least one connecting plate.

In an aspect of an embodiment of the present invention, any of: the least one base length, the at least one slide bearing glide may be adjustable in length.

In an aspect of an embodiment of the present invention, the portable multidirectional surface device may include an adapter, where the adapter may be configured to be removably positioned onto a tool, router, or wood working device and where the adapter may be able to slide along the lips of each of the slide bearing glide(s).

Another aspect of an embodiment of the present invention contemplates a portable multidirectional surface device, which may include: a base, having a planar surface which, in turn, includes at least one fenestration. The portable multidirectional surface device may also include at least one contact point connected to the base, where the at least one contact point may be multidirectional. Aspects of embodiments of the present invention contemplate the utilization of different kinds of bases where the lengths or walls may be combined to form different kinds of bases which are, without limitation, either square, triangular, rectangular, trapezoidal, paralleloid, rhomboid, freeform, or any combination thereof, in shape.

In another aspect of an embodiment of the present invention, the at least one fenestration of the planar surface may include a device mount positioned within the at least one fenestration.

In another aspect of an embodiment of the present invention, the planar surface may include a channel having two sides, where the channel may extend from the at least one fenestration and open out at a portion of the planar surface's periphery.

In another aspect of an embodiment of the present invention the channel may include a longitudinal device mount along each of the channel's length sides.

A further aspect of an embodiment of the present invention contemplates a portable multidirectional surface device, which may include: at least one slide bearing glide, at least one base length positioned adjacent the slide bearing glide, at least one connecting plate, which may be positioned above the at least one base length. In one aspect, the at least one connecting plate may be connected with the at least one base length, the at least one slide bearing glide and the at least one contact point. In an aspect, the at least one contact point may be multidirectional. Finally, the contemplated portable multidirectional surface device may include a planar surface, where the planar surface may be positioned adjacent to any one of the at least one connecting plate. Aspects of embodiments of the present invention contemplate the utilization of different kinds of bases where the lengths or walls may be combined to form different kinds of bases which are, without limitation, either square, triangular, rectangular, trapezoidal, paralleloid, rhomboid, freeform, or any combination thereof, in shape.

In a further aspect of an embodiment of the present invention, the at least one contact point may be a rotating wheel or any other device capable of motion in different directions.

In a further aspect of an embodiment of the present invention, the planar surface may include an adapter, where the adapter may be configured to be removably positioned onto a router and where the adapter may include a fenestration.

In a further aspect of an embodiment of the present invention, the at least one slide bearing glide may be/may include an L-shaped length having two sides. Additionally, the at least one base length may include a length having a square cross-section, where at least one side of the at least one base length may have a smaller width than at least one side of the at least one slide bearing glide.

In a further aspect of an embodiment of the present invention, the portable multidirectional surface device may include a lip, where the lip is the portion of the at least one slide bearing glide that is wider than the at least one side of the at least one base length. Additionally, the lip may be structurally enabled to allow for positioning and operation of a tool, router, or wood working device along the length of the lip.

In a further aspect of an embodiment of the present invention, the planar surface of the portable multidirectional surface device may be configured to slide along the lips. The planar surface may include at least one fenestration, where the at least one fenestration may include a device mount positioned within the at least one fenestration.

In a further aspect of an embodiment of the present invention, the planar surface of the portable multidirectional surface device may include a channel which may have two sides. In one aspect, the channel may extend from the at least one fenestration and open out at a portion of the planar surface's periphery. In another aspect, each of the channel's sides may include a longitudinal channel mount.

A yet further aspect of an embodiment of the present invention contemplates a portable multidirectional surface device, which may include: at least one base length, where each of the at least one base length may include at least one longitudinal track. The contemplated portable multidirectional surface device may also include at least one cross support, positioned below the at least one base length. In one aspect, the at least one cross support may be connected with the at least one base length. The contemplated portable multidirectional surface device may also include at least one contact point connected to the at least one cross support, where each of the at least one contact point may be multidirectional. Finally, the contemplated portable multidirectional surface device may include a slidable adapter plate, where the slidable adapter plate may be slidably positioned along the at least one longitudinal track of each of the at least one base length, and where the slidable adapter plate may include a fenestration with an adapter plate mount within the fenestration.

The invention can be altered by either adding slide bearing glides to the side to side positioning of the router, adding standoffs with extra wheels, adding stationary leveling devices to the legs, extending the travel of the router past the fixture to allow for surfacing near ends of the workpiece, and many other improvements which would be obvious to one skilled in the art of woodworking.

The present invention can be used for additional applications as well. It can be used to surface wood plugs to flush plane, such as on deck boards. It can be used to easily route out defects or cracks in a river table that need to be repaired with a re-pour. This is much more stable than hand routing the defect. The invention can also be used to more easily cut butterfly inlays and such into slabs, flooring, or other surfaces as the free flowing, low resistance device allows for the cutting tool to be easily glided over the workpiece.

PARTS/ELEMENTS

Figure 1A:
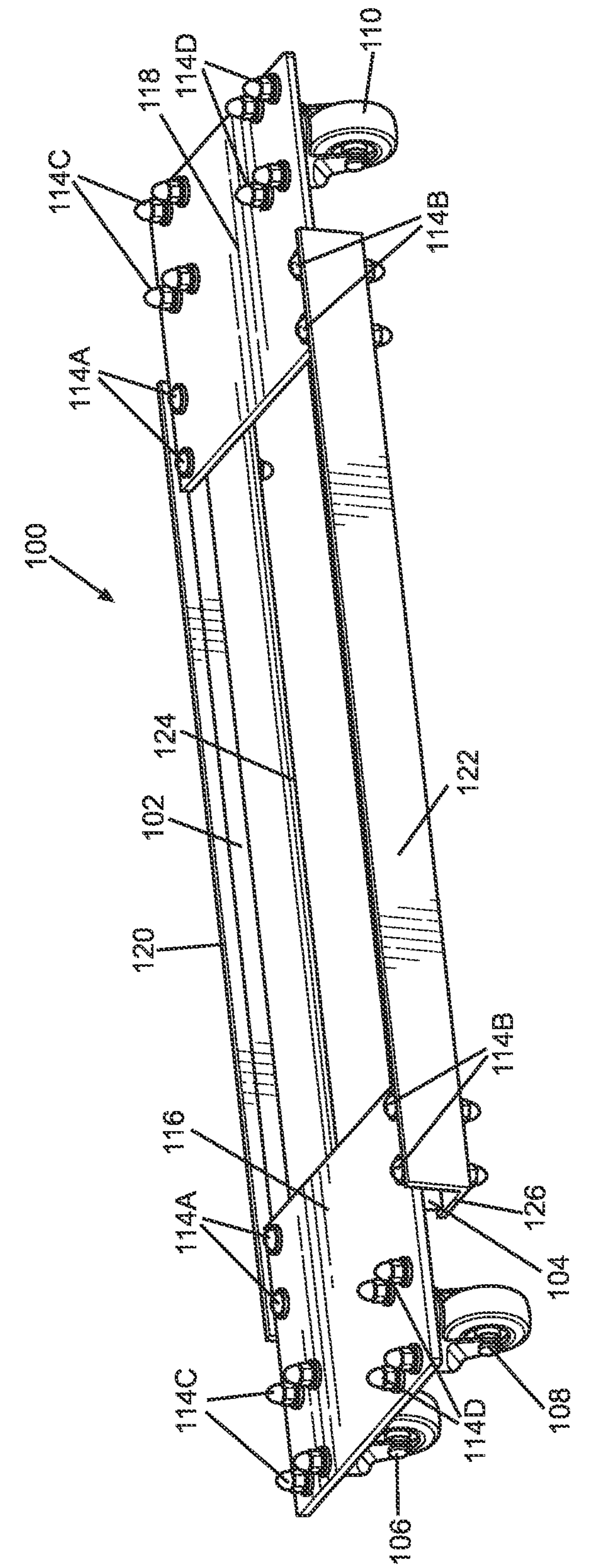
FIG. 1A illustrates a top perspective view of a multidirectional surface device according to an aspect of an embodiment of the present invention.
Figure 1B:
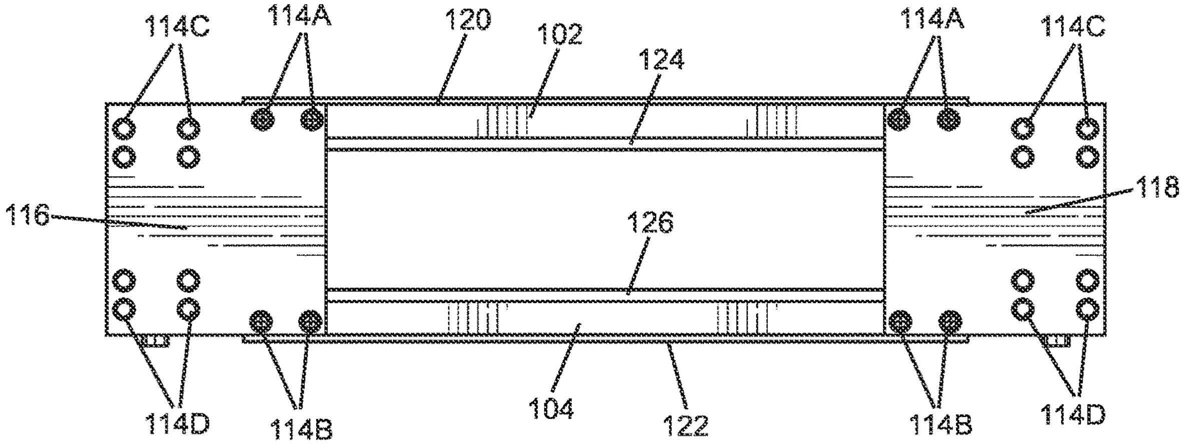
FIG. 1B illustrates a top view of a multidirectional surface device according to an aspect of an embodiment of the present invention.
Figure 1C:
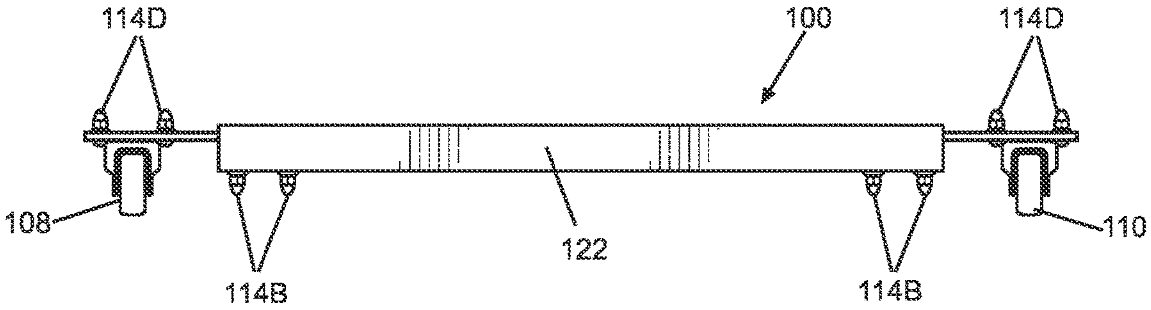
FIG. 1C illustrates a side view of a multidirectional surface device according to an aspect of an embodiment of the present invention.
Figure 1D:
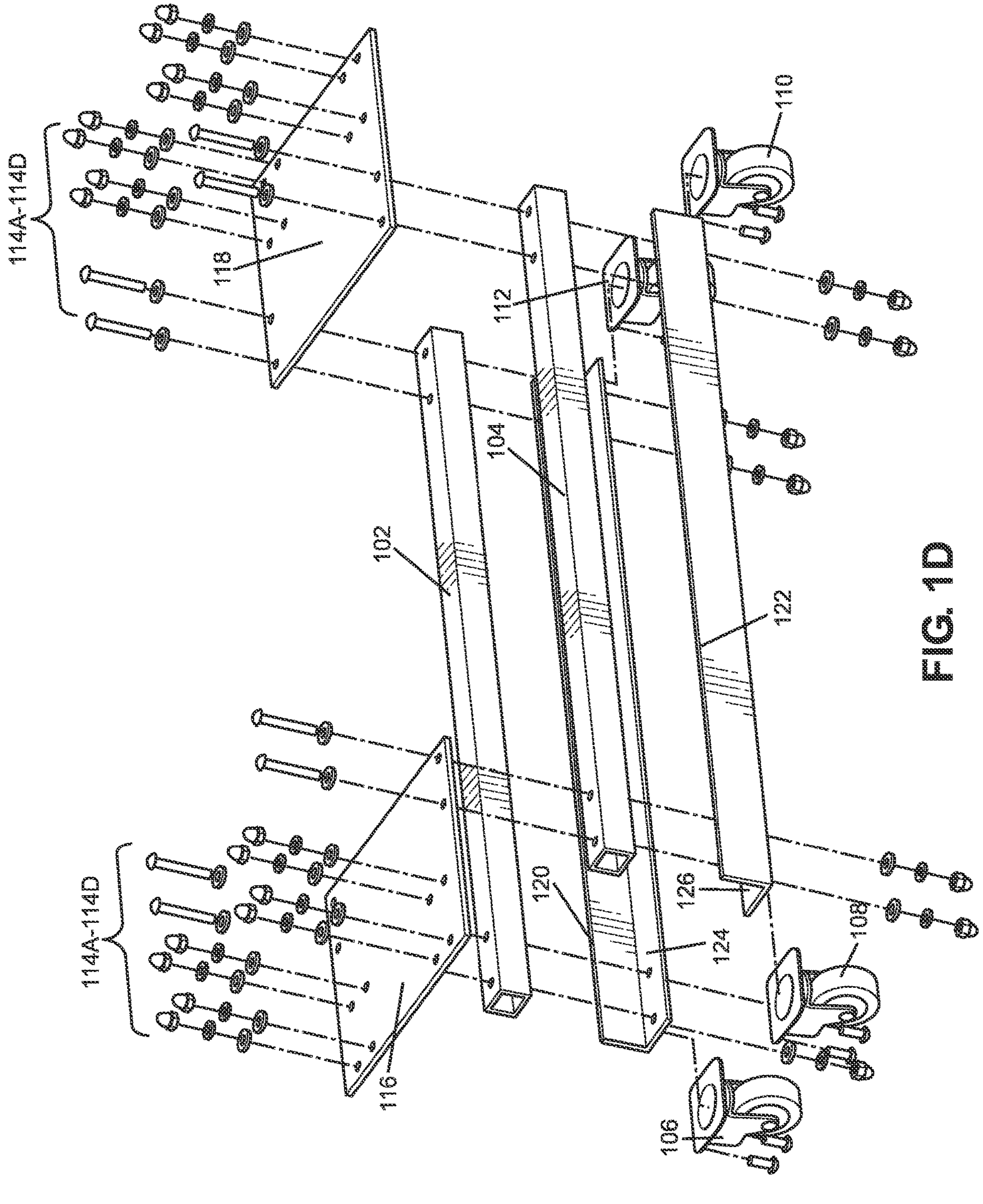
FIG. 1D illustrates an exploded perspective view of parts of a multidirectional surface device according to an aspect of an embodiment of the present invention.
Figure 1E:
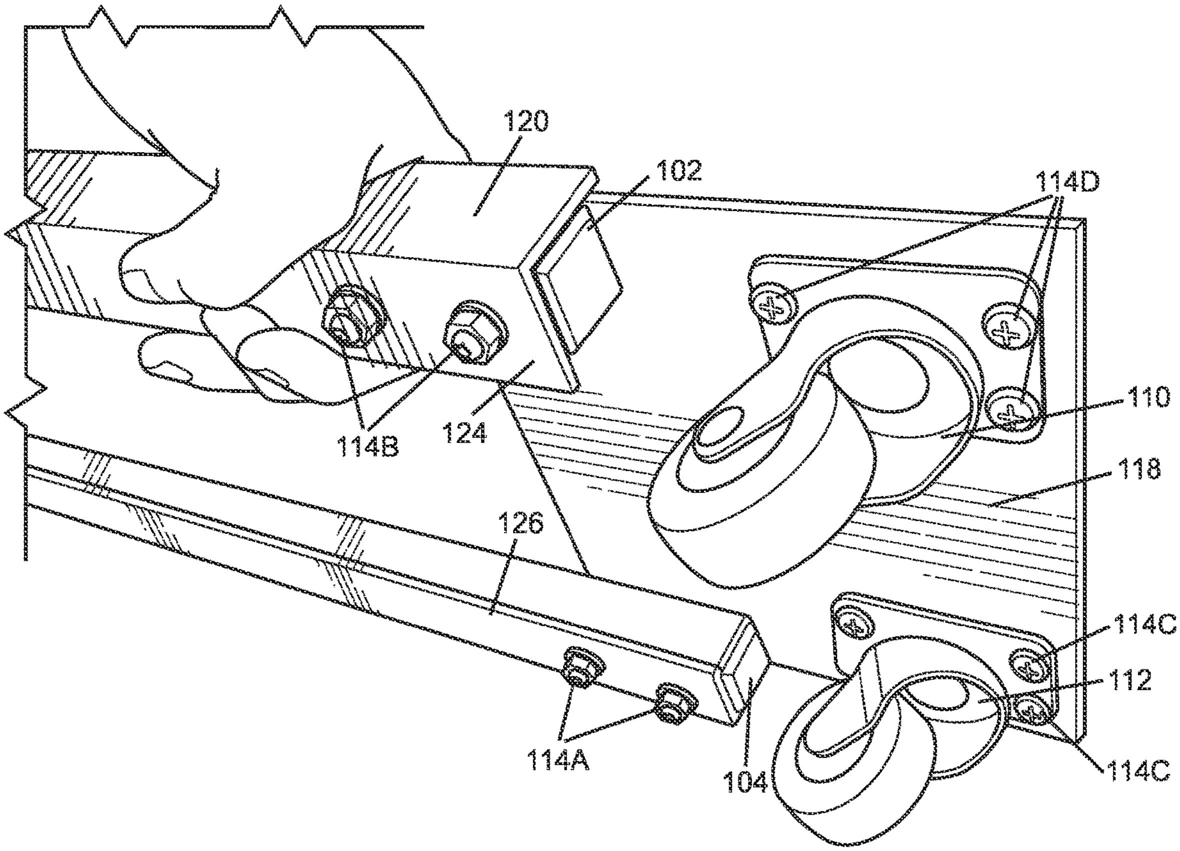
FIG. 1E illustrates a bottom perspective view of a section of the bottom of a multidirectional surface device according to an aspect of an embodiment of the present invention.

100 Multidirectional surface device
102 First base length

104 Second base length
106, 108, 110, 112 Contact points
114A-114D Fasteners
116 FGirst connecting plate
118 Second connecting plate
120 First slide bearing glide
122 Second slide bearing glide
124 Lip of first slide bearing glide
126 Lip of second slide bearing glide
128 First standoff
130 Second standoff
132 Device mount
134 Adapter plate
200 Multidirectional surface device
202 Base with a planar surface
204 Fenestration(s)
206 Mount
208, 210, 212 Contact points
214 Channel
216 Channel mount
300 Multidirectional surface device
302 First base length
304 Second base length
306, 308, 310, 312 Contact points
314 Fasteners
316 First connecting plate
318 Second connecting plate
320 First slide bearing glide
322 Second slide bearing glide
324 Lip of first slide bearing glide
326 Lip of second slide bearing glide
328 Base with planar surface
330 Fenestration
332 Mount
334 Adapter plate
336 Channel
336A, 336B Sides of Channel, 336
338 Channel mount
338A, 338B Mounts of channel sides 336A and 336B
400 Multidirectional surface device
402 First base length
404 Second base length
406, 408, 410, 412 Contact points
414 First cross support
416 Second cross support
418 Adapter plate
420 Adapter plate mount
422 First base length track or rail
424 Second base length track or rail
500 Multidirectional surface device
502 First connecting plate
504 Second connecting plate
506, 508 Contact points
510 Slide glide assembly
512A River table
512B Wood work piece
512C Deck board/Wood Floor
512D Board with rough surface
512E Board for shelf, decorative feature
514 First standoff
516 Second standoff
R Tool, router, or other wood working device
$R_1$ Tool, router, wood working device bit/cutting head
W, Wood peg

DETAILED DESCRIPTION

Referring now to FIGS. 1A-1I, different views of multidirectional surface device 100 are shown or illustrated according to aspects of embodiments of the present invention. Portable multidirectional surface device 100 is shown with a base which includes first base length 102 and second base length 104. In an aspect of an embodiment of the present invention, any one or both of first base length 102 and second base length 104 may be straight or curvilinear. In an aspect of an embodiment of the present invention, any one or both of first base length 102 and second base length 104 may be adjustable in length. It should be noted that the number of base lengths disclosed here is illustrative only as additional base lengths are contemplated in other aspects of embodiments of the present invention. Aspects of embodiments of the present invention contemplate either hollow or solid construction for first and second base lengths 102, 104.

Multidirectional surface device 100 may also include one or more contact points 106, 108, 110 and 112 which are connected to base lengths 102 and 104. In an aspect of an embodiment of the present invention, contact points 106, 108, 110 and 112 may be any device that allows for multidirectional motion such as caster wheels, ball casters or the like. In another aspect of an embodiment of the present invention, any one or more of contact points 106, 108, 110 and 112 may be a rotating wheel. With contact points 106, 108, 110 and 112 of multidirectional surface device 100, multidirectional surface device 100 may be able to move in variety of directions for use of a router, R over a workpiece.

It should be noted that multidirectional surface device 100 could also hold non-wood working tools, wood working devices (other than router, R) that are traditionally handheld such as, without limitation, a drill, palm sander, circular saw, or other powered or non-powered hand tool. The discussion of router, R in this disclosure is exemplary only and not meant to be limiting. Aspects of embodiments of the present invention contemplate the discussion of router, R in this disclosure to also extend to the other possible tools outlined above.

In an aspect of an embodiment of the present invention multidirectional surface device 100 may also include one or more connecting plate(s) 116, 118, positioned above or on top of first and second base lengths 102 and 104.

In an aspect of an embodiment of the present invention first base length 102 and second base length 104 of multidirectional surface device 100 may respectively comprise of slide bearing glides 120, 122. In an aspect of an embodiment of the present invention, slide bearing glides 120, 122 may be L-shaped. In another aspect of an embodiment of the present invention, slide bearing glides 120, 122 may be adjustable in length. Slide bearing glide 120 may be positioned adjacent (lengthwise) or within the length of first base length 102. In another aspect of an embodiment of the present invention, at least one side of slide bearing glide 120 may be wider than the cross-sectional width of first base length 102. For instance, where slide bearing glide 120 is L-shaped, and where first base length 102 has a square cross section, any one of the sides of slide bearing glide 120 may be wider than each side of first base length 102. In another example, where slide bearing glide 120 is L-shaped, and where first base length 102 has a circular cross section, any one of the sides of slide bearing glide 120 may be wider than the circular diameter of first base length 102.

Similarly, in an aspect of an embodiment of the present invention, slide bearing glide 122 may be L-shaped. Slide bearing glide 122 may also be positioned adjacent (lengthwise) or within the length of second base length 104. In another aspect of an embodiment of the present invention, at least one side of slide bearing glide 122 may be wider than the cross-sectional width of second base length 104. For instance, where slide bearing glide 122 is L-shaped, and where second base length 104 has a square cross section, any one of the sides of slide bearing glide 122 may be wider than each side of first base length 104. In another example, where slide bearing glide 122 is L-shaped, and where second base length 104 has a circular cross section, any one of the sides of slide bearing glide 122 may be wider than the circular diameter of first base length 104.

In an aspect of an embodiment of the present invention, one respective side of each of connecting plates 116 and 118 may be connected with first base length 102 and slide bearing glide 120 by way of a plurality of fasteners 114A, while another respective side of each of connecting plates 116 and 118 may be connected with second base length 104 and slide bearing glide 122 by way of a plurality fasteners 114B. Connecting plate 116 may be connected with contact points 106 and 112 by way of fasteners 114C, while connecting plate 118 may be connected with contact points 108 and 110 by way of fasteners 114D. In another aspect of an embodiment of the present invention, connecting plates 116 and 118 may be releasably fastened or connected to first and second base lengths 102, 104 and slide bearing glides 120, 122.

Figure 1F:
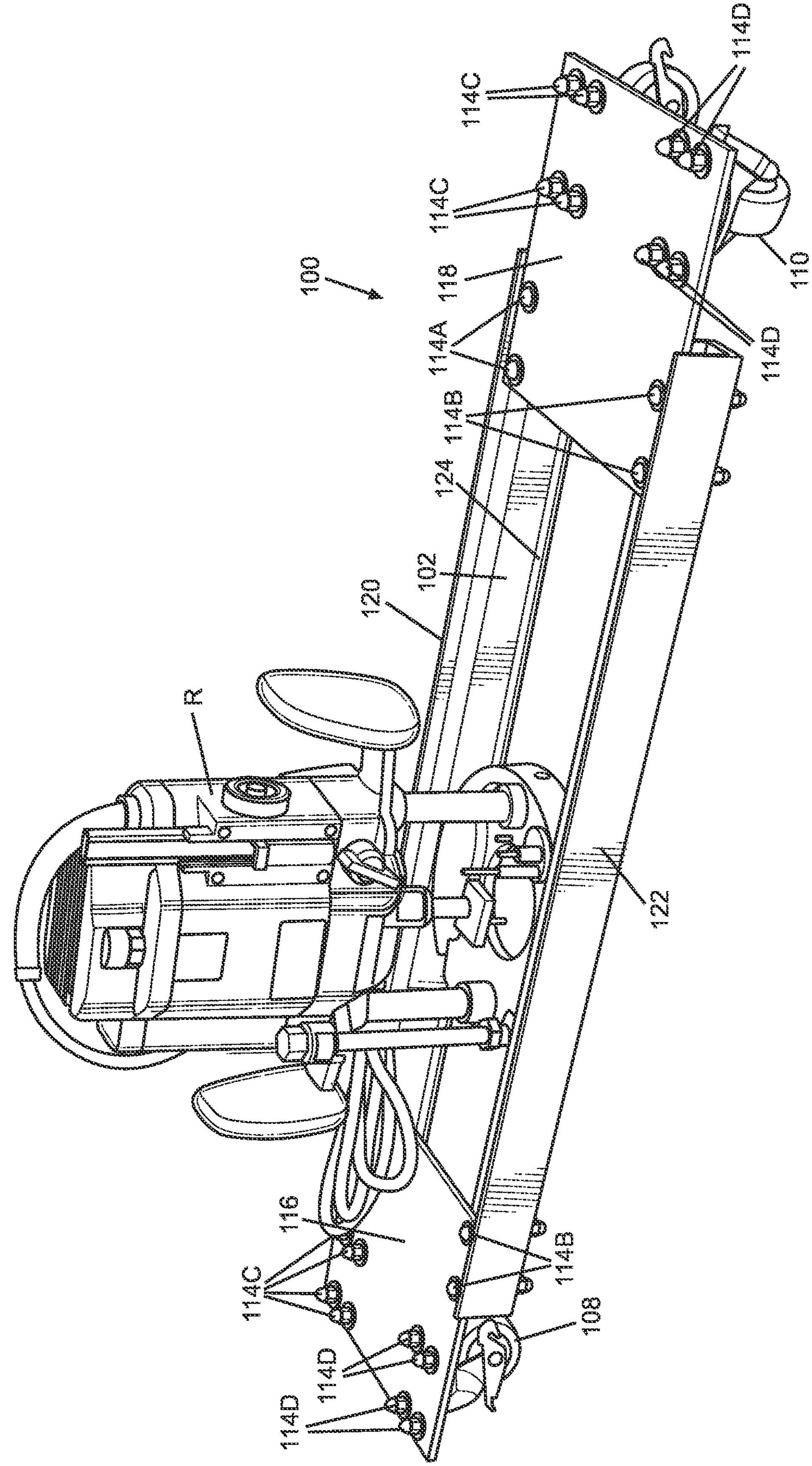
FIG. 1F illustrates a top perspective view of a multidirectional surface device with a router in position according to an aspect of an embodiment of the present invention.
Figure 1G:
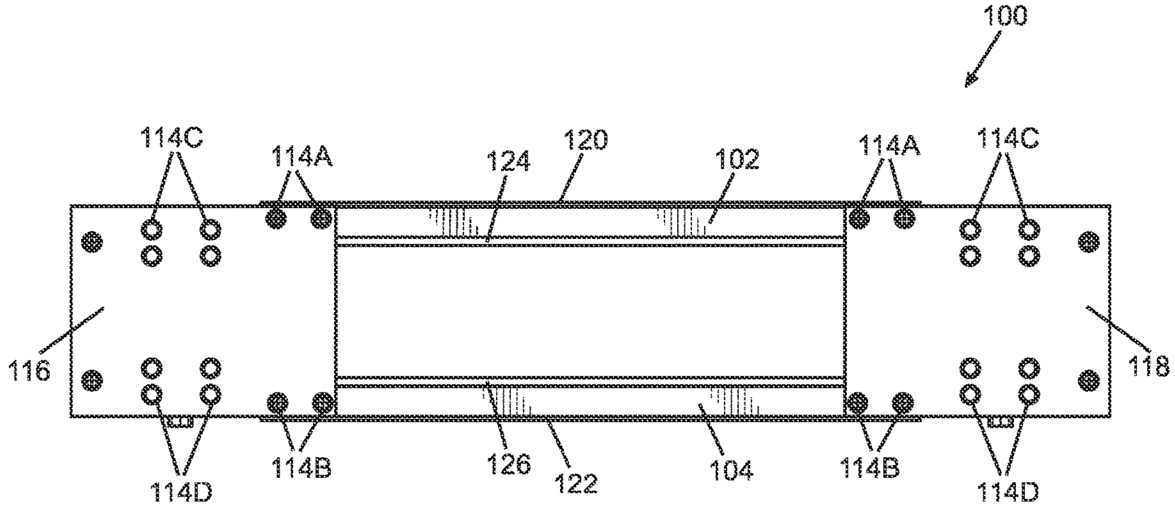
FIG. 1G illustrates a top perspective view of a multidirectional surface device with standoffs according to an aspect of an embodiment of the present invention.
Figure 1H:
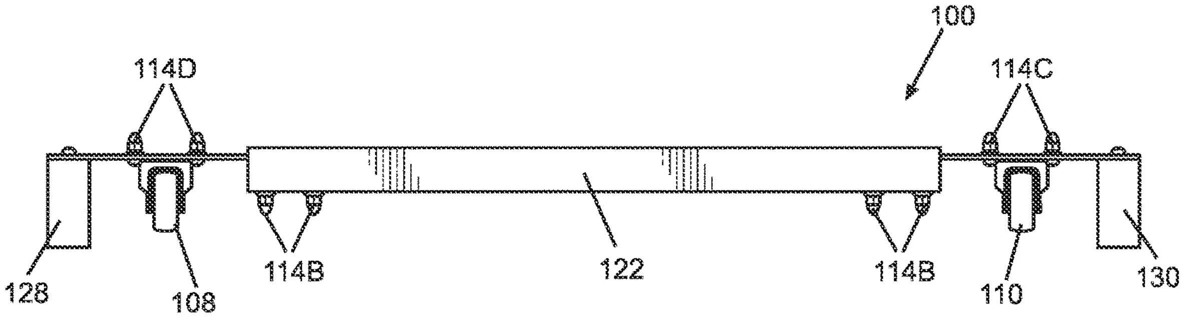
FIG. 1H illustrates a side view of a multidirectional surface device with standoffs according to an aspect of an embodiment of the present invention.
Figure 1I:
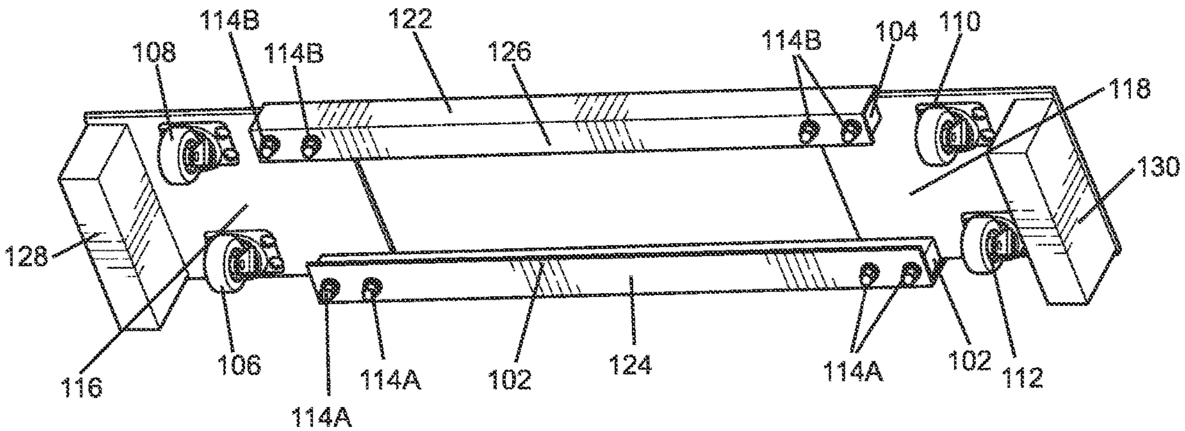
FIG. 1I illustrates a bottom perspective view of a multidirectional surface device with standoffs according to an aspect of an embodiment of the present invention.
Figure 1J:
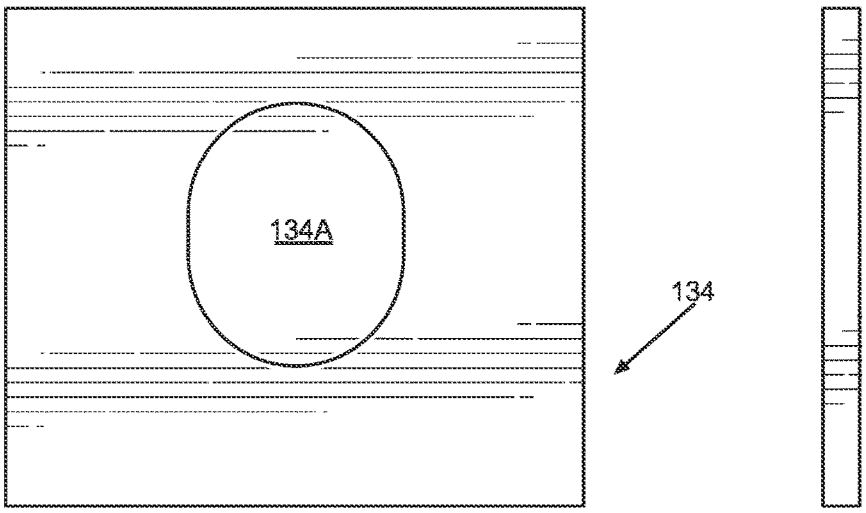
FIG. 1J illustrates a top view of an adapter plate for a multidirectional surface device according to an aspect of an embodiment of the present invention.

In an aspect of an embodiment of the present invention, where the side width of slide bearing glide 120 is wider than the cross-sectional width of first base length 102, the extra width constitutes lip 124 which forms a track adjacent the length of first base length 102. Similarly, in an aspect of an embodiment of the present invention, where the side width of slide bearing glide 122 is wider than the cross-sectional width of second base length 104, the extra width constitutes lip 126 which forms a track adjacent the length of second base length 104. Lips 124 and 126 together form a dual track along which releasably fastened connecting plates 116 and 118 may slide along, in one aspect of an embodiment of the present invention. In an aspect of an embodiment of the present invention, lips 124 and 126 may be structurally configured to function as a device mount for a device, such as a router. Lips 124 and 126 may be structurally configured to allow for positioning and operation of a router in conjunction with the portable multidirectional surface device. This is illustrated in FIG. 1F, where a router, R is enabled to glide or slide along the dual track formed by lips 124 and 126 of multidirectional surface device 100, while planning an epoxy surface, for instance. Here, lips 124 and 126 act as a mount and track along which router R is able to operate.

In an aspect of an embodiment of the present invention, multidirectional surface device 100 may include first standoff 128 and second standoff 130 where first standoff 128 is connected to first base length 102 and second standoff 130 is connected to second base length 104. In one aspect of an embodiment of the present invention, multidirectional surface device 100 may include extra contact points positioned or connected to standoffs 128 and 130. Standoffs 128 and 130 function to stop the router from rolling around. Standoffs 128 and 130 also enable multidirectional surface device 100 to operate in alternate fixed position(s). Standoffs 128 and 130 may also be used to allow the user to route, for instance, a dado groove across a board to support a shelf. Alternatively, straight wheels may be attached (see FIGS. 1H and 1I) and multidirectional surface device 100 can then run along long rail components parallel to a slab. In an aspect of an embodiment of the present invention, standoffs may be set to be of a taller height than contact points 106, 108, 110 and 112. As such, when installed, standoffs prevent multidirectional surface device 100 from moving easily over the workpiece since the contact points e.g. wheels are no longer in contact with the workpiece. This could be utilized when a straight-line groove is desired to be cut in a piece. In an aspect of an embodiment of the present invention, standoffs could alternatively be suction devices which could be used to provide additional rigidity to the positioning of multidirectional surface device 100. In one aspect, they could use a shop vacuum or similar suction producing apparatus, to lock the fixture in a stationary position, to the surface below.

Figure 1K:
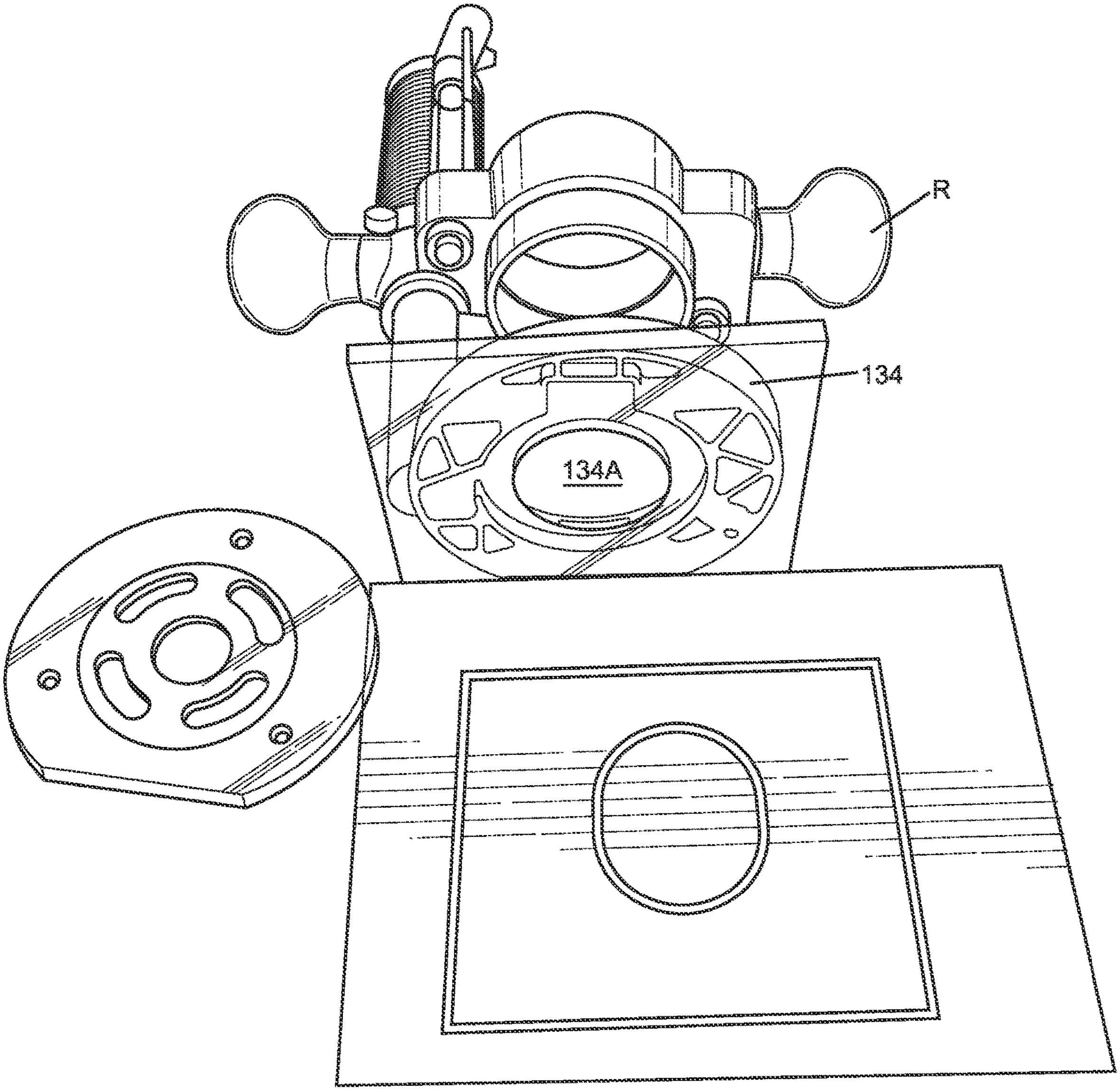
FIG. 1K illustrates an adapter plate for a multidirectional surface device, shown with a router, according to an aspect of an embodiment of the present invention.
Figure 1L:
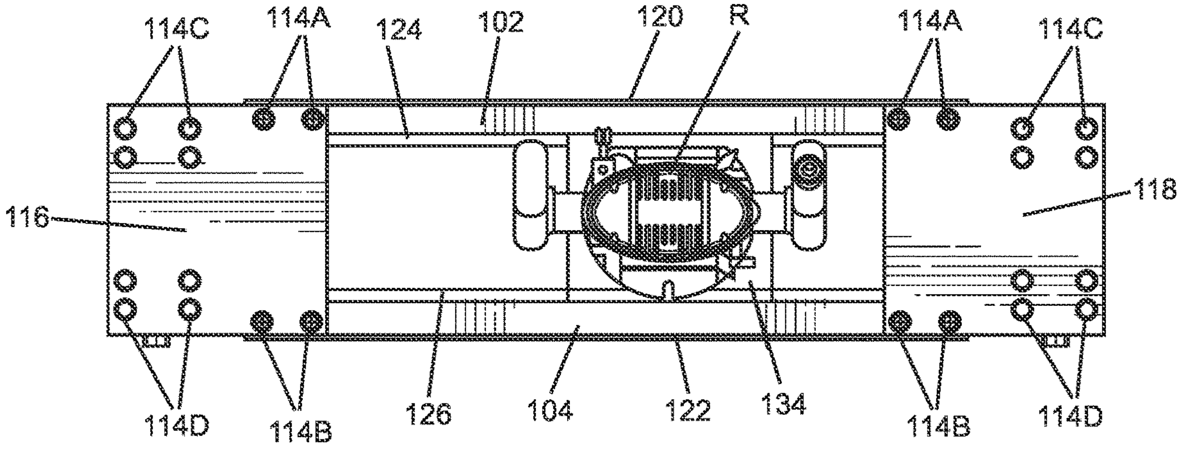
FIG. 1L illustrates a top view of a multidirectional surface device with a router and an adapter plate according to an aspect of an embodiment of the present invention.
Figure 1M:
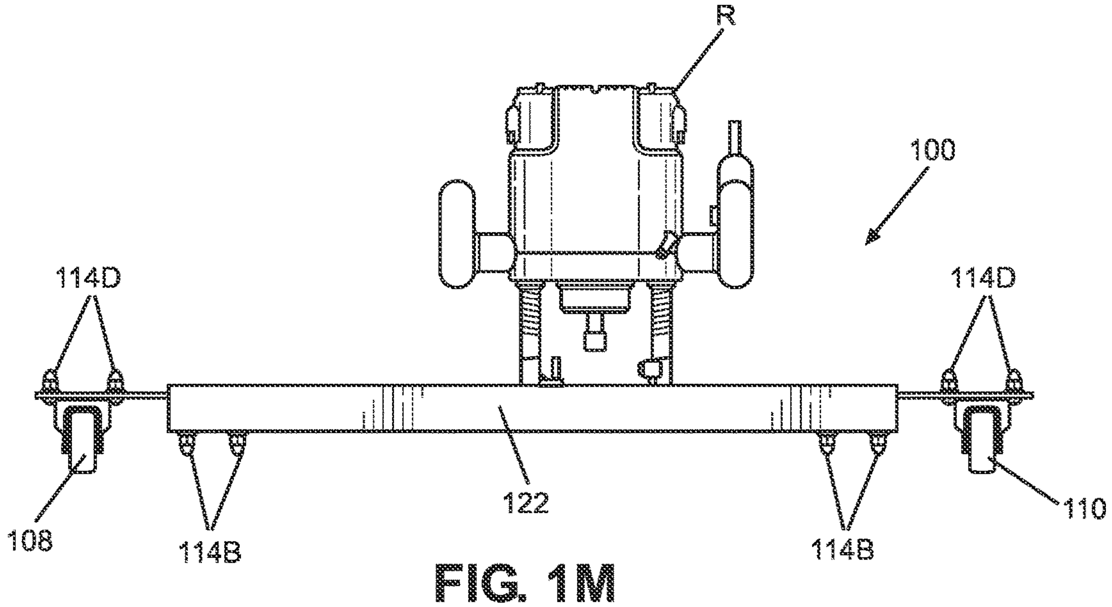
FIG. 1M illustrates a side view of a multidirectional surface device with a router and an adapter plate according to an aspect of an embodiment of the present invention.
Figure 1N:
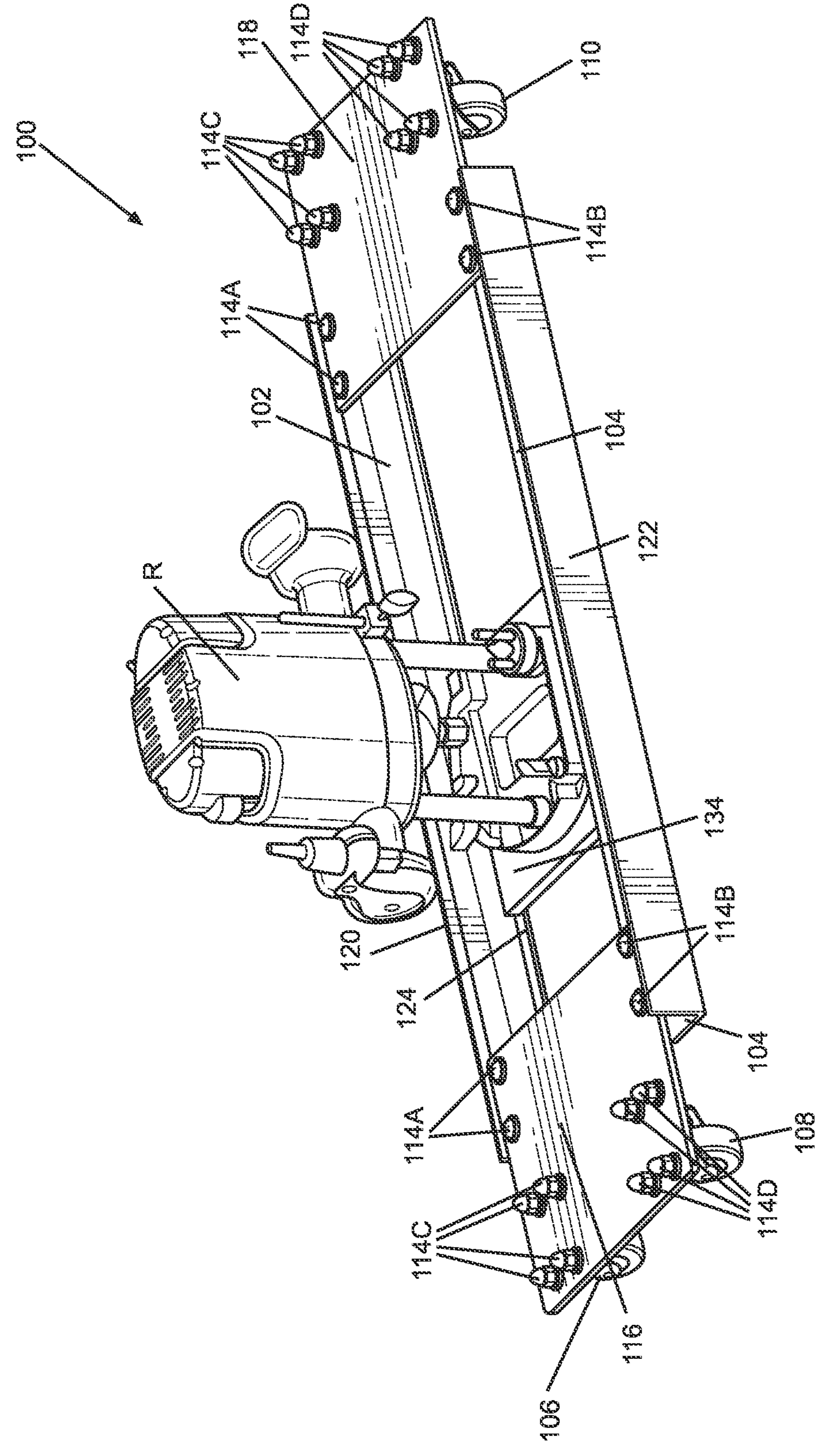
FIG. 1N illustrates a top perspective view of a multidirectional surface device with a router and an adapter plate according to an aspect of an embodiment of the present invention.

Referring now FIGS. 1J through 1N, different views of an adapter plate 134 for multidirectional surface device 100 are shown according to aspects of embodiments of the present invention. Adapter plate 134 may be used to accommodate different router makes or models to use in conjunction with multidirectional surface device 100 because not all router bases are the same. In an aspect of an embodiment of the present invention, adapter plate 134 may be bolted to the base of router R (FIG. 1K). Adapter plate 134 may include a central fenestration 134A through which router R may be able to operate through to the planed surface or workpiece. Adapter plate 134 may operate along the dual track of lips 124 and 126 of slide bearing glides 120 and 122

Figure 2A:
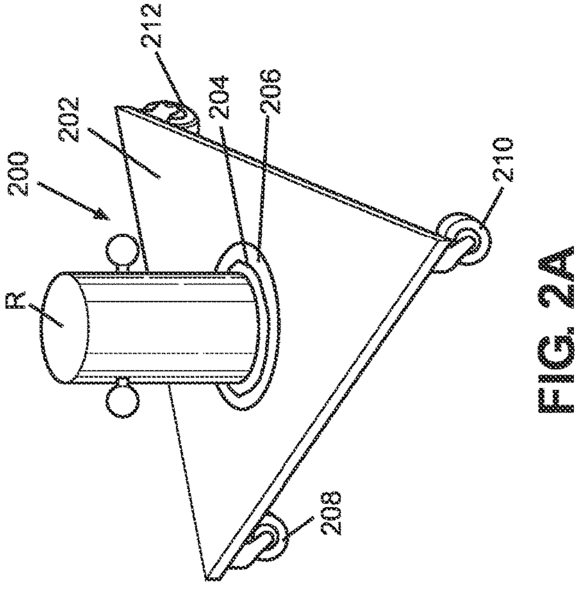
FIG. 2A illustrates a top perspective view of a multidirectional surface device with a router and a planar base according to an aspect of an embodiment of the present invention.
Figure 2B:
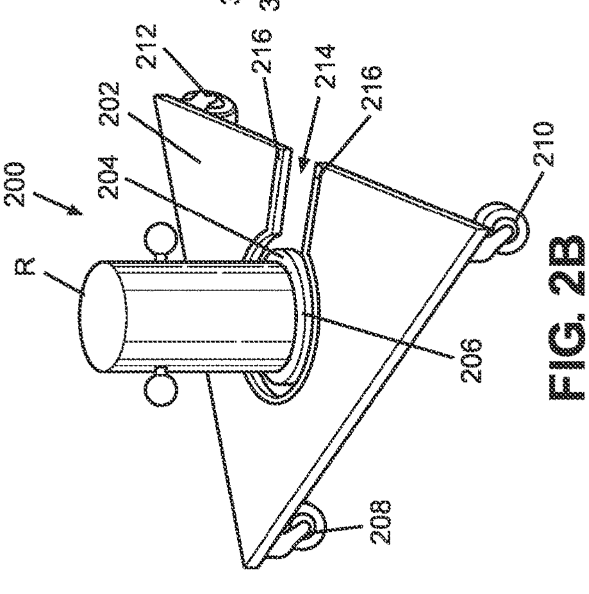
FIG. 2B illustrates a top perspective view of a multidirectional surface device with a router and a planar base having a channel according to an aspect of an embodiment of the present invention.

Referring now to FIGS. 2A and 2B, top perspective views of multidirectional surface device 200 are shown with router R and planar base 202 according to an aspect of an embodiment of the present invention. Multidirectional surface device 200 may have a planar base 202 which may include fenestration 204 through which a router, R may be used for planing surfaces or performing wood working work.

Aspects of embodiments of the present invention contemplate the utilization of different kinds of bases where the surface(s), length(s) or wall(s) may be, or may be combined, to form different kinds of bases which are, without limitation, either square, triangular, rectangular, trapezoidal, paralleloid, rhomboid, freeform, or any combination thereof, in shape.

In an aspect of an embodiment of the present invention, fenestration 204 may include mount 206 upon which router R may be installed for use. In another aspect of an embodiment of the present invention, multidirectional surface device 200 may include channel 214 where channel 214 may extend from fenestration 204 out to a portion of the periphery of planar base 202. Channel 214 may also include channel mount 216 along which router, R may be used to slide along. Multidirectional surface device 200 may include contact points 208, 210 and 212. In an aspect of an embodiment of the present invention, contact points 208, 210 and 212 may be any device that allows for multidirectional motion such as caster wheels, ball casters or the like. In another aspect of an embodiment of the present invention, any one or more of contact points 208, 210 and 212 may be a rotating wheel.

In an aspect of an embodiment of the present invention, contact points 208, 210 and 212 may be connected with the bottom of planar base 202 of multidirectional surface device 200. It should be noted that while multidirectional surface device 200 is shown having a triangular base, such a shape is for illustration only as other shapes or configurations are also contemplated. It should also be noted that the number of contact points 208, 210 and 212 is for illustration purposes only as more contact points are also contemplated by aspects of embodiments of the present invention.

Figure 3A:
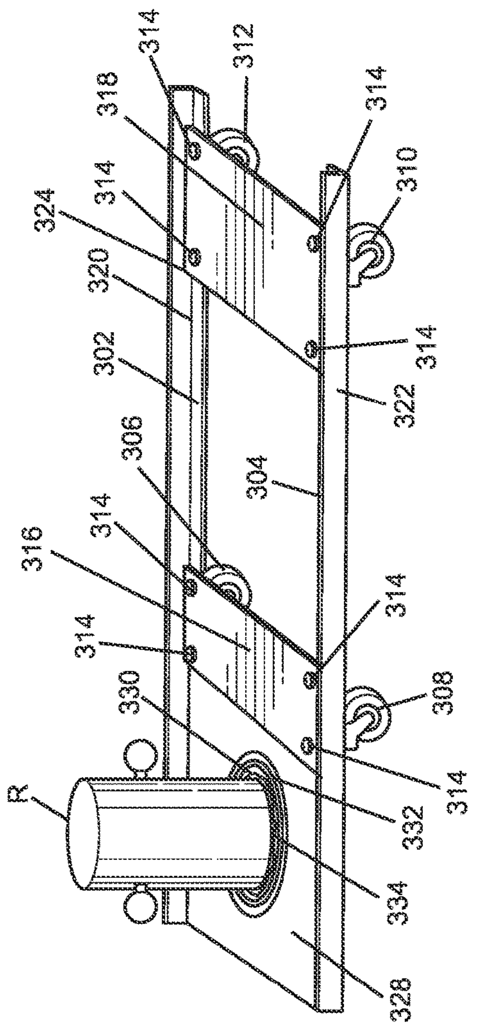
FIG. 3A illustrates a top perspective view of a multidirectional surface device having base lengths and a planar base according to an aspect of an embodiment of the present invention.
Figure 3B:
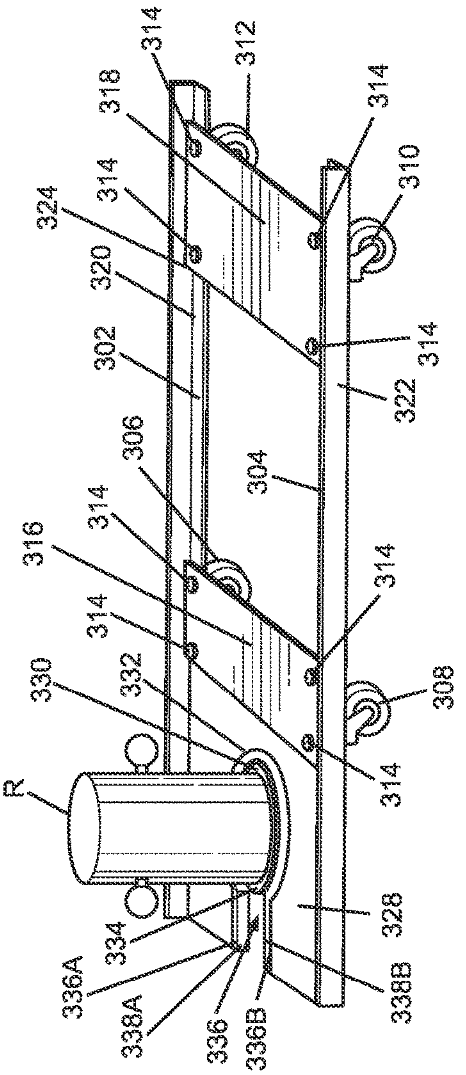
FIG. 3B illustrates a top perspective view of a multidirectional surface device having base lengths and a planar base with a channel according to an aspect of an embodiment of the present invention.

Referring now to FIGS. 3A and 3B, top perspective views of multidirectional surface device 300 having base lengths 302 and 304 and planar base 328 are shown according to aspects of embodiments of the present invention. Multidirectional surface device 300 is shown with a base which includes first base length 302 and second base length 304. In an aspect of an embodiment of the present invention, any one or both of first base length 302 and second base length 304 may be straight or curvilinear. In an aspect of an embodiment of the present invention, any one or both of first base length 302 and second base length 304 may be adjustable in length. It should be noted that the number of base lengths disclosed here is illustrative only as additional base lengths are contemplated in other aspects of embodiments of the present invention.

Multidirectional surface device 300 may also include one or more contact points 306, 308, 310 and 312 which are connected to base lengths 302 and 304. In an aspect of an embodiment of the present invention, contact points 306, 308, 310 and 312 may be any device that allows for multidirectional motion such as caster wheels, ball casters or the like. In another aspect of an embodiment of the present invention, any one or more of contact points 306, 308, 310 and 312 may be a rotating wheel.

In an aspect of an embodiment of the present invention multidirectional surface device 300 may also include one or more connecting plate(s) 316, 318, positioned above or on top of first and second base lengths 302 and 304.

In an aspect of an embodiment of the present invention first base length 302 and second base length 304 of multidirectional surface device 300 may respectively comprise of slide bearing glides 320, 322. In an aspect of an embodiment of the present invention, slide bearing glides 320, 322 may be L-shaped. Slide bearing glide 320 may be positioned adjacent (lengthwise) the length of first base length 302. In another aspect of an embodiment of the present invention, at least one side of slide bearing glide 320 may be wider than the cross-sectional width of first base length 302. For instance, where slide bearing glide 320 is L-shaped, and where first base length 302 has a square cross section, any one of the sides of slide bearing glide 320 may be wider than each side of first base length 302. In another example, where slide bearing glide 320 is L-shaped, and where first base length 302 has a circular cross section, any one of the sides of slide bearing glide 320 may be wider than the circular diameter of first base length 302.

Similarly, in an aspect of an embodiment of the present invention, slide bearing glide 322 may be L-shaped. Slide bearing glide 322 may also be positioned adjacent (lengthwise) the length of second base length 304. In another aspect of an embodiment of the present invention, at least one side of slide bearing glide 322 may be wider than the cross-sectional width of second base length 304. For instance, where slide bearing glide 322 is L-shaped, and where second base length 304 has a square cross section, any one of the sides of slide bearing glide 322 may be wider than each side of first base length 304. In another example, where slide bearing glide 322 is L-shaped, and where second base length 304 has a circular cross section, any one of the sides of slide bearing glide 322 may be wider than the circular diameter of first base length 304.

In an aspect of an embodiment of the present invention, one respective side of each of connecting plates 316 and 318 may be connected with first base length 302 and slide bearing glide 320 by way of a plurality of fasteners 314, while another respective side of each of connecting plates 316 and 318 may be connected with second base length 304 and slide bearing glide 322 by way of a plurality fasteners 314. Connecting plate 316 may be connected with contact points 306 and 312 by way of fasteners 314, while connecting plate 318 may be connected with contact points 308 and 310 by way of fasteners 314. In another aspect of an embodiment of the present invention, connecting plates 316 and 318 may be releasably fastened or connected to first and second base lengths 302, 304 and slide bearing glides 320, 322.

In an aspect of an embodiment of the present invention, where the side width of slide bearing glide 320 is wider than the cross-sectional width of first base length 302, the extra width constitutes lip 324 which forms a track adjacent the length of first base length 302. Similarly, in an aspect of an embodiment of the present invention, where the side width of slide bearing glide 322 is wider than the cross-sectional width of second base length 304, the extra width constitutes lip 326 which forms a track adjacent the length of second base length 304. Lips 324 and 326 together form a dual track along which releasably fastened connecting plates 316 and 318 may slide along, in one aspect of an embodiment of the present invention. In an aspect of an embodiment of the present invention, lips 324 and 326 may be structurally configured to function as a device mount for a device, such as a router. Lips 324 and 326 may be structurally configured to allow for positioning and operation of a router in conjunction with the portable multidirectional surface device. Lips 324 and 326 may act as a mount and track along which router R is able to operate.

Multidirectional surface device 300 may also include base 328 having a planar surface. In an aspect of an embodiment of the present invention, base 328 may be positioned along lips 324 and 326 and adjacent to any one of connecting plates 316 318. For instance, base 328 may be positioned adjacent to connecting plate 316 in a position that is further away from connecting plate 318. Similarly, base 328 may be positioned adjacent to connecting plate 316 in a position that is further away from connecting plate 316. This configuration allows for the use and operation of a router, R in a space beyond the space between connecting plates 316 and 318.

In an aspect of an embodiment of the present invention, base 328 may include fenestration 330 through which router, R is allowed to operate. In another aspect of an embodiment of the present invention, base 328 may also include a mount 332 upon which router, R may be positioned during operation. Base 328 may, in one aspect of an embodiment of the present invention, be positioned at one end of both first base length 302 and second base length 304. Base 328 may also be structurally configured to slide along lips 324 and 326 of multidirectional surface device 300, thus enabling a greater range of operation for router, R. In an aspect of an embodiment of the present invention, multidirectional surface device 300 may include adapter 334 which would enable the use of different routers, regardless of their size. Adapter 334 may include a fenestration 334A through which router, R would be able to operate.

Referring now to FIG. 3B specifically, multidirectional surface device 300 may include channel 336 having two sides 336A and 336B. In an aspect of an embodiment of the present invention, channel 336 may extend from fenestration 330 of base 328 out to a portion of the periphery of base 328. In an aspect of an embodiment of the present invention, channel 336 may include longitudinal channel mount 338A and 338B respectively along channel sides 336A and 336B and upon which router, R would be installed for operation along the length of channel 336.

Figure 4:
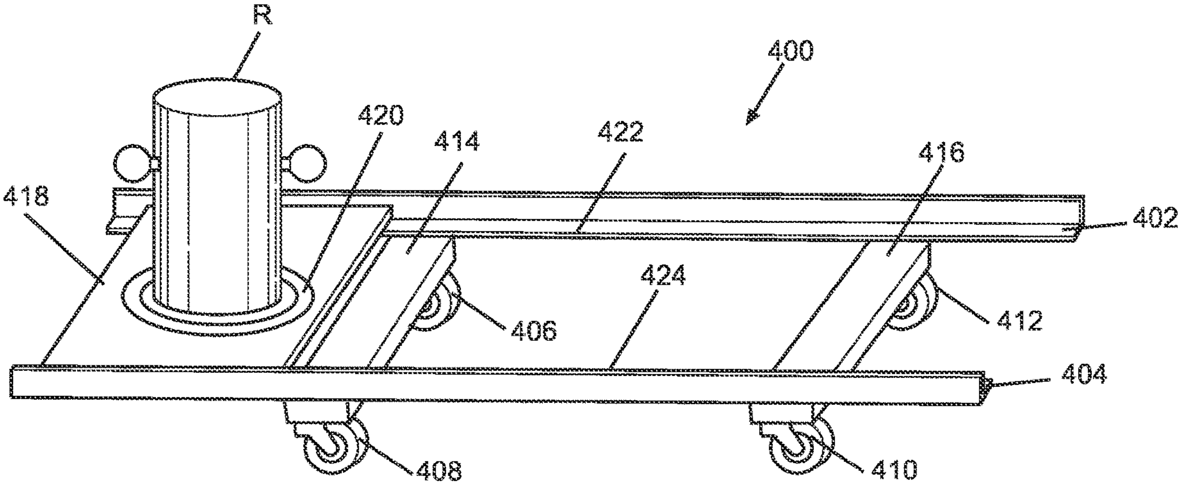
FIG. 4 illustrates a top perspective view of a multidirectional surface device having base lengths and a slidable adapter plate according to an aspect of an embodiment of the present invention.

Referring now to FIG. 4, multidirectional surface device 400 having base lengths 402 and 404 and slidable adapter plate 418 is shown according to an aspect of an embodiment of the present invention. In an aspect of an embodiment of the present invention, multidirectional surface device 400 may include first base length 402 and second base length 404. First base length 402 may itself include first base length longitudinal track or rail 422 while second base length may include second base length longitudinal track or rail 424.

First base length 402 may be connected to second base length 404 by way of first cross support 414 and second cross support 416. First and second cross supports 414 and 416 both work to stabilize multidirectional surface device 400. Connected underneath first cross support 414 are contact points 406 and 412, while connected underneath second cross support 416 are contact points 408 and 410.

In an aspect of an embodiment of the present invention, multidirectional surface device 400 may include adapter plate 418 which may slide along longitudinal tracks or rails 422 and 424 of first and second base lengths, respectively. In an aspect of an embodiment of the present invention, longitudinal tracks or rails 422 and 424 may be positioned above first and second cross supports 414 and 416, thereby allowing adapter plate 418 to slide above them. Adapter plate 418 may include adapter plate mount 420 used for installation of router, R.

Referring now to FIGS. 5A-5E a side view of a multidirectional surface device 500 is shown as multidirectional surface device 500 is being used in conjunction with a router, R for a variety of applications according to aspects of embodiments of the present invention. It should be noted that, according to aspects of embodiments of the present invention, multidirectional surface device 500 as shown in FIGS. 5A through 5E, may be representative of the operation of multidirectional surface devices 100, 200, 300 and 400, with the similar or corresponding constituent elements of each multidirectional surface device.

Figure 5A:
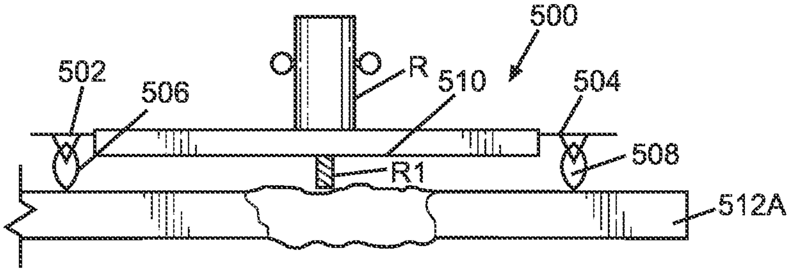
FIGS. 5A-5E illustrate a side view of a multidirectional surface device, being used, in conjunction with a router, for different applications according to aspects of embodiments of the present invention.

Referring specifically to FIG. 5A, multidirectional surface device 500 is shown being used on river table 512A having first and second connecting plates 502 and 504. First connecting plate 502, in aspects of embodiments of the present invention, may be representative or similar in structure, features, function etc. to previously discussed first connecting plates 116, 316. Second connecting plate 504, in aspects of embodiments of the present invention, may be representative or similar in structure, features, function etc. to previously discussed second connecting plates 118, 318. Multidirectional surface device 500 may also include contact points 506, 508 and glide assembly 510. Multidirectional surface device 500 may include additional contact points (not shown).

Glide assembly 510 may include base length(s), and slide bearing glide(s), which, while not shown in detail here in FIGS. 5A-5E, in aspects of embodiments of the present invention, may be representative or similar in structure, features, function etc. to previously discussed base lengths 102, 104, 302, 304, 402 and 404. Contact points 506, 508 may be connected to glide assembly 510 by way of first and second connecting plates 502, 504. Multidirectional surface device 500 may include standoffs 514, 516.

Multidirectional surface device 500 may, in aspects of embodiments of the present invention similar in structure, features, function etc. to multidirectional surface devices 200, 300, and 400, incorporate the use of router, R having a router bit, $R_1$. Router, R may be configured to slide along glide assembly 510 and may be able to extend to the desired work surface by router bit, $R_1$.

Operation of multidirectional surface device 500, in conjunction with router, R, is shown with respect to exemplary surfaces 512A-512E as shown in FIGS. 5A-5E. Multidirectional surface device 500, as shown in FIG. 5A, may be used to flatten epoxy in a wood river table 512A. Flattening of the epoxy may be made possible by use router bit, $R_1$ of router R.

Figure 5B:
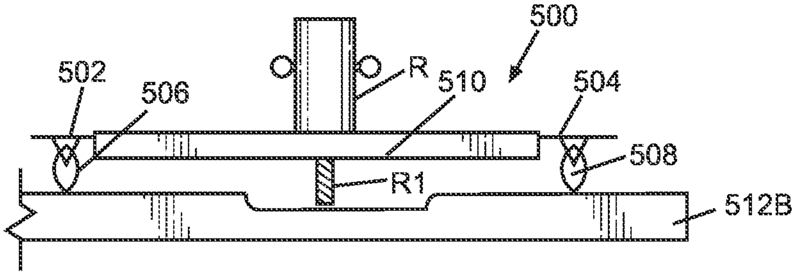
Figure 5C:
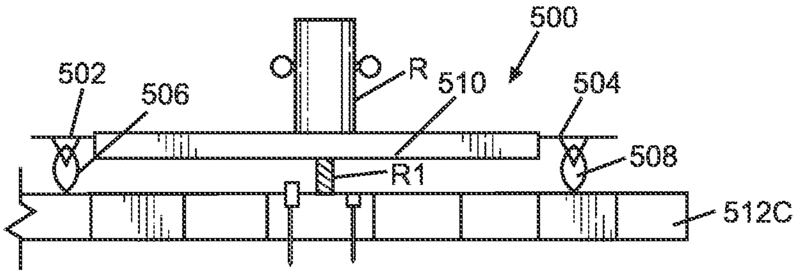

Multidirectional surface device 500, as shown in FIG. 5B, may be used to carve or drill out a space within woodwork piece 512B for a faux epoxy river table. Multidirectional surface device 500, as shown in FIG. 5C, may be used to cut down wooden pegs, W, in items such as deck boards or wood floors so that the wood pegs may be flush with the surface. Here, router, R may be moved along glide assembly 510 to cut down identified wood pegs, W that need to be cut down.

Figure 5D:
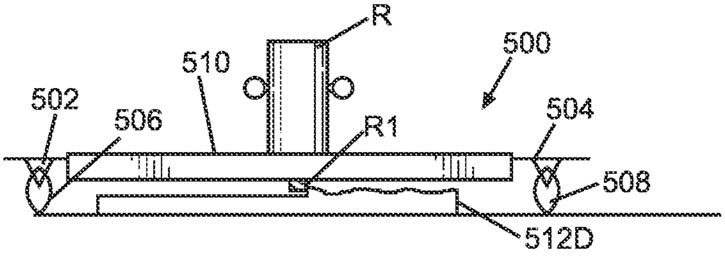

Multidirectional surface device 500, as shown in FIG. 5D, may be used to surface a board to a smooth thickness as a conventional planer would do. Here, router bit of router, R may be used to smoothen the rough sawn portion of board 512D. Router, R may be moved along glide assembly 510 to smoothen the rough sawn portion of board 512D.

Figure 5E:
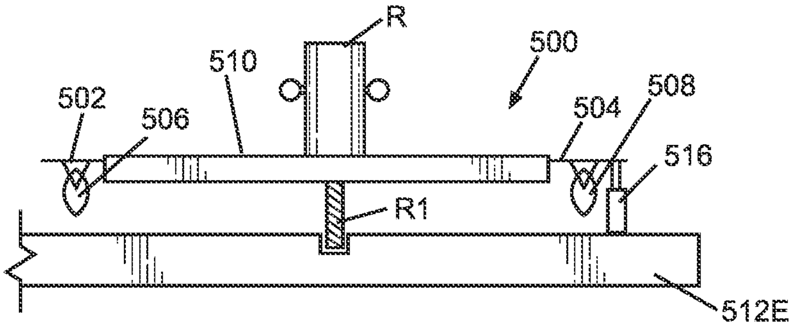

Multidirectional surface device 500, as shown in FIG. 5E, may be used, in conjunction with standoffs 514, 516 to cut a groove across a board, where the groove could be used to support a shelf or where the grove may be a decorative feature. Standoffs 514, 516 may be connected to connecting plates 502, 504 respectively as shown. Here, router, R may be moved back and forth along glide assembly 510 in order to cut a straight groove. Standoffs 514, 516 may function to hold multidirectional surface device 500 in a stationary position to enable router, R to cut a straight line.

Although this present invention has been disclosed with reference to specific forms and embodiments, it will be evident that a great number of variations may be made without departing from the spirit and scope of the present invention. For example, parts or elements may be rearranged, equivalent elements may be substituted for those specifically disclosed and certain features of the present invention may be used independently of other features—all without departing from the present invention as outlined above, in the appended figures and the claims presented below.

What is claimed is:

1. A portable multidirectional surface device, comprising:
at least one slide bearing glide;
at least one base length positioned adjacent said slide bearing glide;
at least one connecting plate, positioned above said at least one base length, wherein said at least one connecting plate is connected with said at least one base length and said at least one slide bearing glide; and
at least one contact point connected to said at least one connecting plate, wherein said at least one contact point is multidirectional; wherein said at least one slide bearing glide comprises of an L-shaped length having two sides, wherein said at least one base length comprises of a length having a square cross-section, and wherein at least one side of said at least one base length has a smaller width than each side of said at least one slide bearing glide.

2. The portable multidirectional surface device of claim 1 wherein said at least one contact point is a rotating wheel.

3. The portable multidirectional surface device of claim 1, wherein said at least one side of said at least one slide bearing glide comprises of a lip wherein said lip is said portion of said at least one slide bearing glide that is wider than said side of said at least one base length, wherein said lip is structurally enabled to allow for positioning and operation of a router along length of said lip.

4. The portable multidirectional surface device of claim 1, further comprising at least one standoff connected to said at least one connecting plate.

5. The portable multidirectional surface device of claim 1, wherein any of: said least one base length, said at least one slide bearing glide is adjustable in length.

6. The portable multidirectional surface device of claim 3, further comprising of an adapter, wherein said adapter is configured to be removably positioned onto a wood working device and wherein said adapter is able to slide along said lips.

7. A portable multidirectional surface device, comprising:
a base, wherein said base comprises of a planar surface having at least one fenestration; and
at least one contact point directly connected to said base, wherein said at least one contact point is multidirectional; wherein said at least one fenestration comprises of a device mount positioned within said at least one fenestration.

8. The portable multidirectional surface device of claim 7, further comprising of a channel having two sides, wherein said channel extends from said at least one fenestration and opens out at a portion of said base's periphery.

9. The portable multidirectional surface device of claim 8, wherein said channel comprises of a longitudinal device mount along each of said channel's length sides.

10. A portable multidirectional surface device, comprising:
at least one slide bearing glide;
at least one base length positioned adjacent said slide bearing glide;
at least one connecting plate, positioned above said at least one base length, wherein said at least one connecting plate is connected with said at least one base length and said at least one slide bearing glide;
at least one contact point connected to said at least one connecting plate, wherein each contact point is multidirectional; and
a planar surface, wherein said planar surface is positioned adjacent to any one of said at least one connecting plate; wherein said at least one slide bearing glide comprises of an L-shaped length having two sides, wherein said at least one base length comprises of a length having a square cross-section, and wherein at least one side of said at least one base length has a smaller width than at least one side of said at least one slide bearing glide.

11. The portable multidirectional surface device of claim 10, wherein said at least one contact point is a rotating wheel.

12. The portable multidirectional surface device of claim 10, wherein said planar surface comprises of an adapter, wherein said adapter is configured to be removably positioned onto a router and wherein said adapter comprises of a fenestration.

13. The portable multidirectional surface device of claim 10, comprising of a lip wherein said lip is said portion of said at least one side of said at least one slide bearing glide that is wider than said at least one side of said at least one base length, wherein said lip is structurally enabled to allow for positioning and operation of a router along length of said at least one slide bearing glide of said portable multidirectional surface device.

14. The portable multidirectional surface device of claim 13, wherein said planar surface is configured to slide along said lips, wherein said planar surface comprises of at least one fenestration, and wherein said at least one fenestration comprises of a device mount positioned within said at least one fenestration.

15. The portable multidirectional surface device of claim 14, wherein said planar surface further comprises of a channel comprising of two sides, wherein said channel extends from said at least one fenestration and opens out at a portion of said planar surface's periphery and wherein each of said channel's sides comprises of a longitudinal channel mount.

16. A portable multidirectional surface device, comprising:

at least one base length, wherein each of said at least one base length comprises of at least one longitudinal track;

at least one cross support, positioned below said at least one base length, wherein said at least one cross support is connected with said at least one base length;

at least one contact point connected to said at least one cross support, wherein said at least one contact point is multidirectional; and a slidable adapter plate, wherein said slidable adapter plate is slidably positioned along said at least one longitudinal track of each of said at least one base length, wherein said slidable adapter plate comprises of a fenestration and an adapter plate mount within said fenestration.

* * * * *